(12) United States Patent
Dorjgotov et al.

(10) Patent No.: US 8,237,910 B2
(45) Date of Patent: Aug. 7, 2012

(54) POLARIZATION INDEPENDENT LIQUID CRYSTAL-BASED ETALON AND DEVICES USING SAME

(75) Inventors: Enkh-Amgalan Dorjgotov, Kent, OH (US); Philip J. Bos, Hudson, OH (US); Achintya K. Bhowmik, Milpitas, CA (US)

(73) Assignee: Kent State University, Kent, OH (US)

( * ) Notice: Subject to any disclaimer, the term of this patent is extended or adjusted under 35 U.S.C. 154(b) by 936 days.

(21) Appl. No.: 12/112,219

(22) Filed: Apr. 30, 2008

(65) Prior Publication Data

US 2009/0322971 A1 Dec. 31, 2009

(51) Int. Cl.
*G02F 1/13* (2006.01)
(52) U.S. Cl. ............... 349/198; 349/86; 349/96
(58) Field of Classification Search .................. None
See application file for complete search history.

(56) References Cited

U.S. PATENT DOCUMENTS

| | | | | |
|---|---|---|---|---|
| 4,779,959 A * | 10/1988 | Saunders | | 349/198 |
| 5,068,749 A * | 11/1991 | Patel | | 349/198 |
| 5,552,912 A * | 9/1996 | Sharp et al. | | 349/117 |
| 6,392,806 B2 | 5/2002 | Swanson | | |
| 6,650,455 B2 | 11/2003 | Miles | | |
| 7,079,203 B1 * | 7/2006 | Huang et al. | | 349/95 |
| 2002/0109915 A1 | 8/2002 | Mori et al. | | |
| 2005/0105016 A1 * | 5/2005 | Kurihara et al. | | 349/96 |
| 2006/0062014 A1 | 3/2006 | Tseng et al. | | |
| 2007/0258029 A1 * | 11/2007 | Nakagawa et al. | | 349/119 |

OTHER PUBLICATIONS

Dorjgotov et al., "P-62.4: Liquid-Crystal Etalon Device for High-Efficiency Field-Sequential Display," SID, May 22-25, 2007.
"Engadget," pp. 1-4, at http://www.engadget.com/tag/microprojector/, last visited on Feb. 7, 2008.
Patel et al., "Electrically tunable and polarization insensitive Fabry-Perot etalon with a liquid-crystal film," Appl. Phys. Lett. 58 (22), (1991).
Morita et al., "Polarization-insensitive tunable liquid crystal Fabry-Perot filter incorporating polymer liquid crystal waveplates," Proc. SPIE LC 2, San Diego (1998).

* cited by examiner

*Primary Examiner* — Hemang Sanghavi
(74) *Attorney, Agent, or Firm* — Fay Sharpe LLP

(57) ABSTRACT

A liquid crystal etalon includes a chiral nematic material contained in a liquid crystal cell having alignment surfaces configured to bias the chiral nematic material toward a twisted liquid crystal configuration with a twist less than 360°. Electrodes are arranged to apply an operative electrical bias to the liquid crystal cell. Mirrors disposed about the chiral nematic material define a resonant optical cavity. At a first electrical bias the etalon is transmissive for light of a first wavelength via a selected liquid crystal twist angle and cavity thickness at which different non-equal eigenmodes reach resonance conditions simultaneously. In a projector embodiment, a projection system with a field sequential image projection light source is coupled with the liquid crystal etalon, the etalon electrodes are patterned into pixels defining a display area, and the projector is operated in a field sequential illumination mode.

29 Claims, 4 Drawing Sheets

POLARIZATION INDEPENDENT LIQUID CRYSTAL-BASED ETALON AND DEVICES USING SAME

BACKGROUND

The following relates to the optical, optoelectronic, electro-optical, display, light-switching, light modulation, and related arts.

There are diverse applications for transmissive light switch that is substantially attenuation-free and polarization-independent. One such application is in mobile large-area color displays. The concept is a small, "pocketable" projector unit including a battery-powered projection light source and an image formation device that spatially and temporally modulates light so as to form a large-area display on any available wall or other uniform surface. Development of such devices has been hampered by light attenuation in the optical switching elements due to color filters and polarization-dependent absorption. A projection light source generating white light and using color filters to provide a full color display inherently loses about two-thirds of the input light. Such attenuation is problematic in any projection device, but is especially problematic in a battery-powered pocketable projector because the available optical input intensity is limited by the available battery power.

Color filters can be avoided by using by using three separate projection systems, one for each of the three primary colors (e.g., red, green, and blue). However, the use of separate projection systems increases size and bulk, which is undesirable in a compact projector device.

Color filters can in principle also be avoided by using a field sequential approach in which primary colors (e.g., red, green, and blue) are input sequentially into a single light modulation device at a rate substantially faster than the human eye response. The light modulation device display is modulated in synch with the sequential primary color light inputs so as to generate a rapid succession of corresponding primary color images that are visually perceived as a single full-color image. The intensity of each color component can be modulated using a suitable pulse modulation approach such as pulse width modulation (PWM).

However, in the field sequential approach the same optical switching device processes all the primary color inputs in the temporal sequence, which calls for a wide optical bandwidth switching device having an operational bandwidth encompassing most of the visible spectrum. This is difficult to achieve using a transmission optical switching device. Reflective microelectromechanical system (MEMS) based switching systems can be constructed with nearly 100% reflectivity across the entire visible spectrum. However, reflective light switching devices add substantial complexity to the system and can adversely affect device yield, robustness, and product reliability. Moreover, a reflective optical switch array imposes geometrical limitations on a pocketable projector device, for example making a pen-shaped projector geometry difficult to attain.

BRIEF DESCRIPTION

In some illustrative embodiments disclosed as illustrative examples herein, a liquid crystal etalon is disclosed, comprising: a chiral nematic material; a liquid crystal cell containing the chiral nematic material and having one or more alignment surfaces configured to urge the chiral nematic material toward a twisted liquid crystal configuration having a twist of less than 360 degrees; electrodes operatively coupled with the liquid crystal cell to apply an operative electrical bias to the liquid crystal cell; and mirrors disposed about the chiral nematic material to define a resonant optical cavity.

In some illustrative embodiments disclosed as illustrative examples herein, a liquid crystal etalon is disclosed, comprising: a liquid crystal material; a liquid crystal cell containing the liquid crystal material and urging the liquid crystal material toward a twisted liquid crystal configuration having a twist greater than 90 degrees and less than 360 degrees; electrodes operatively coupled with the liquid crystal cell to electrically bias the liquid crystal cell; and mirrors disposed about the liquid crystal material to define a resonant optical cavity.

In some illustrative embodiments disclosed as illustrative examples herein, a projector is disclosed, comprising: a projection system; and a liquid crystal etalon as set forth in the immediately preceding paragraph, wherein the electrodes of the etalon are patterned into pixels defining a display area and the liquid crystal etalon is arranged respective to the projection system to project an image of the display area.

In some illustrative embodiments disclosed as illustrative examples herein, a liquid crystal etalon is disclosed, comprising: a liquid crystal material; a liquid crystal cell containing the liquid crystal material and urging the liquid crystal material toward a twisted liquid crystal configuration; electrodes operatively coupled with the liquid crystal cell to electrically bias the liquid crystal cell; and mirrors disposed about the liquid crystal material to define a resonant optical cavity; the liquid crystal material and the liquid crystal cell being configured to define a first operational state at a first electrical bias in which the etalon exhibits at least about 90% transmittance for unpolarized light of a first wavelength, the liquid crystal material having a first twisted liquid crystal configuration at the first electrical bias.

In some illustrative embodiments disclosed as illustrative examples herein, an image generating device is disclosed, comprising an etalon including a liquid crystal cell containing a liquid crystal material and biasing the liquid crystal material toward a twisted liquid crystal configuration, and electrodes operatively coupled with the liquid crystal cell to electrically bias the liquid crystal cell. The electrodes of the etalon define a display area of pixels, wherein the pixels are switchable by a first electrical bias into a first operational state in which the pixel is transmissive for light of a first wavelength and are switchable by a second electrical bias into a second operational state in which the pixel is transmissive for light of a second wavelength, and wherein the pixels are transmissive for light of a third wavelength in one of the first and second operational states. The projector further comprises a controller electrically communicating with the electrodes of the etalon to switch pixels between the first and second operational states in synchronization with field sequential illumination having illumination sub-cycles corresponding to the first, second, and third wavelengths in order to generate a color display.

DETAILED DESCRIPTION

Figure 1:
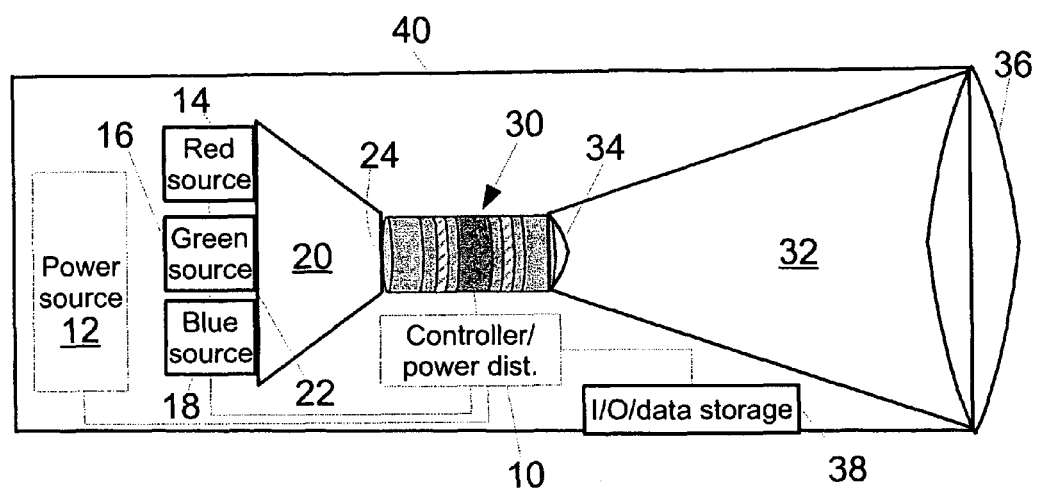
FIG. 1 diagrammatically shows a portable projector.

With reference to FIG. 1, an illustrative projector is diagrammatically shown. The projector employs sequential mode operation under the direction of a controller 10 which also provides for power distribution of power from a battery or other suitable power source 12. Alternatively, the control and power distribution circuitry can be arranged separately. The controller operates first, second, and third primary color light sources, such as a red or reddish light source 14, a green, yellow, greenish, or yellowish light source 16, and a blue or bluish light source 18. The primary color light sources 14, 16, 18 can be variously embodied as light emitting diodes (LEDs), semiconductor laser diodes, incandescent microlamps, or so forth. An optical combiner 20 receives light from the primary color light sources 14, 16, 18 at an input end 22 and generates a combined light output emitted at an output end 24. In sequential mode operation, only one of the primary color light sources 14, 16, 18 is operational at any given time, so that the optical combiner 20 in effect operates as an optical multiplexor emitting light at the single output end 24 at any given time instant that generated by whichever of the primary color light sources 14, 16, 18 is operational at that time instant. Optionally, the output end 24 includes or has associated therewith suitable optics (not shown) configured to collect, spread, collimate, homogenize, or otherwise manipulate the emitted light.

The light emitted at the output end 24 of the optical combiner 20 is received by an optical switching etalon 30. As will be described herein, the optical switching etalon 30 is an optically transmissive element that defines a display area made up of pixels that can be electro-optically switched or modulated by the etalon 30. Thus, the output of the optical switching etalon 30 is an optical image beam that serves as input to a projection system 32 that diverges or projects the image beam. The projection system 32 includes suitable diverging, collimating, or other optics such as an illustrated input planoconvex lens 34 and an illustrated biconvex projection lens 36. The optical elements 34, 36 are merely illustrative examples, and the projection system 32 can include any suitable optics, and in some contemplated embodiments may include as few as a single lens. The illustrative projector of FIG. 1 suitably projects still images or video content received by the controller 10 from a data interface or data storage 38, the controller 10 being configured to operate the optical switching device to cause the display area to provide a representation of the received still images or video.

The projector of FIG. 1 can be variously embodied. In some embodiments, a housing 40 of the projector has a tubular or barrel shape, and the projector is pen-shaped. Alternatively, the housing can be rectangular or otherwise shaped. In some embodiments, the projector may be embodied as a component of a cellular telephone, personal data assistant (PDA), handheld email reader, or the like (not shown). The data interface or data storage 38 can similarly be variously embodied. In a standalone pen-type projector, the data interface or data storage 38 may be a universal serial bus (USB) or other wired or wireless digital input interface combined with on-board random access memory (RAM), FLASH memory, or other on-board digital data storage. If the projector is a component of a cellular telephone, PDA, or the like, then the data interface or data storage 38 is suitably embodied as on-board digital data storage of that unit, optionally also including the wireless cellular telephone interface, a Bluetooth wireless interface, a wired USB port, or other wired or wireless communication pathway or combination of pathways. It is also contemplated for the projector of FIG. 1 to be integrated with a laptop computer or other larger device.

Figure 2:
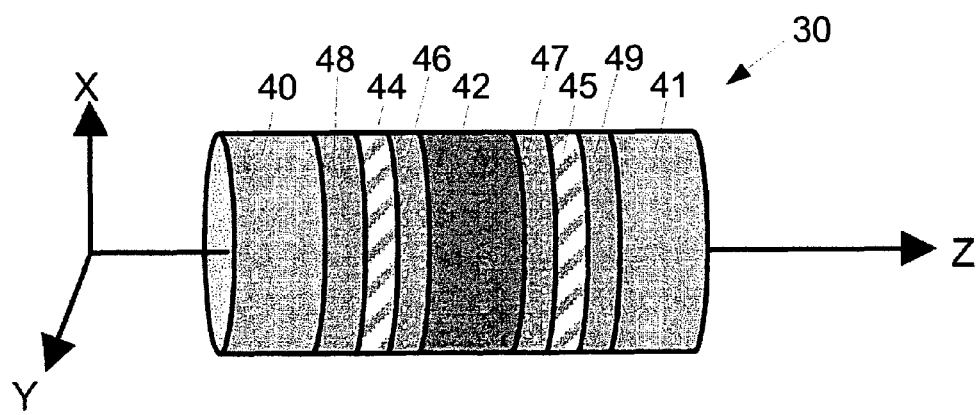
FIG. 2 diagrammatically shows a larger view of an optical switching etalon of the projector of FIG. 1.

With continuing reference to FIG. 1 and with further reference to FIG. 2, the optical switching etalon 30 is described. The optical switching etalon 30 has a topology that is substantially similar to that of a typical liquid crystal device, and includes a pair of parallel spaced-apart light-transmissive substrates 40, 41 made of glass or another transparent material, and a liquid crystal material 42 disposed in a gap between the spaced-apart substrates 40, 41. The gap thickness is maintained by glass bead spacers or other spacers (not shown) that control the spacing of the spaced-apart substrates 40, 41. The optical switching device further includes electrodes 44, 45 made of indium tin oxide (ITO) or another electrically conductive but optically transparent material. The electrodes 44, 45 enable applying a selected electrical bias across the cell gap. Alignment layers 46, 47 urge the director direction of the liquid crystal material 42 toward a selected spatial configuration. The alignment layers 46, 47 can be formed by any suitable method, such as by rubbing. The illustrated alignment layers 46, 47 are disposed on both surfaces of the substrates 40, 41 defining the gap containing the liquid crystal material 42, which enables introduction of a twist to the director of the liquid crystal material 42 as a function of position across the gap. Alternatively, it is contemplated to have only a single alignment layer on only one of the substrates 40, 41, and to rely upon a chiral property of the liquid crystal material 42 to impart a desired twist.

The etalon 30 of FIG. 2 also includes dielectric mirrors 48, 49 that define a resonant optical cavity (sometimes called a Fabry-Perot cavity or etalon cavity) containing the liquid crystal material 42. Mirrors including materials other than dielectrics, such as including thin metallic layers, are also contemplated. The dielectric mirrors 48, 49 are each suitably embodied as a single dielectric layer, or as a Bragg reflector stack of two or more dielectric layers of different dielectric materials. It is also contemplated to include other materials, such as thin light-transmissive metallic layers, reflective surfaces of the substrates 40, 41, or so forth. It is further also contemplated to have the electrodes 44, 45 integrated as part of the dielectric mirrors 48, 49. The resonance center frequency and bandwidth are controlled by the configuration of the etalon 30 as a whole, including optical properties of the dielectric mirrors 48, 49, optical properties of the liquid crystal material 42, and the thickness of the gap between the spaced-apart substrates 40, 41 (or, more precisely, between the dielectric mirrors 48, 49). In some embodiments, optical properties of the electrodes 44, 45 and/or of the alignment layers 46, 47 may also impact the resonance center frequency, bandwidth, or both, of the resonant cavity.

Figure 3:
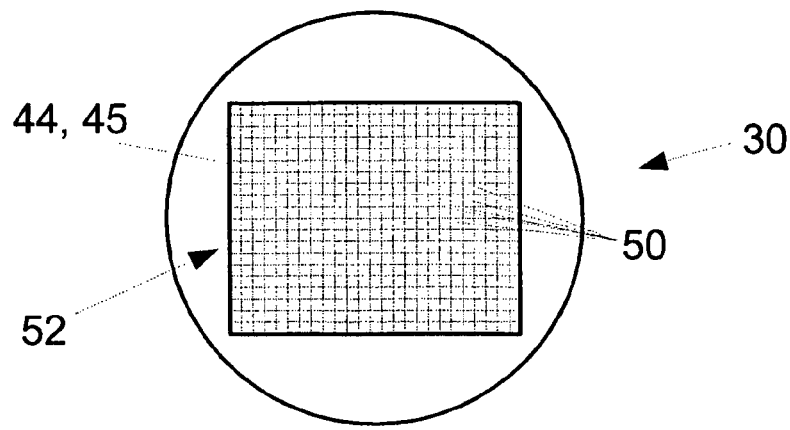
FIG. 3 diagrammatically shows a patterned electrode suitably used to define a display area of the etalon of FIG. 2.

With continuing reference to FIGS. 1 and 2 and with further reference to FIG. 3, when the optical switching etalon 30 is used as a display device, as in the projector of FIG. 1 for example, the electrodes 44, 45 are suitably patterned into pixels 50 defining a display area 52, as diagrammatically shown in FIG. 3. It is emphasized that FIG. 3 is diagrammatic and does not quantitatively reflect the typically large number of pixels used in a typical display area, for example a 1024× 768 pixel display such as is used in a standard (non-widescreen) laptop computer display or so forth. Each pixel 50 typically includes a transistor (not shown) that enables selective electrical bias to be applied to that pixel, and electrical traces (not shown) interconnect the transistors in an independently addressable pixel control arrangement.

The projector of FIG. 1 is an illustrative application of the etalon 30. More generally, the etalon 30 can be used in any application that usefully can utilize a transmissive optical switch. Other such applications include, for example: other displays including non-projector displays that use field sequential cycling; optical switches for fiber optical communication systems; and so forth. In embodiments for applications other than display applications, it is contemplated for the electrodes 44, 45 to not be patterned into pixels.

The liquid crystal material 42 of the etalon 30 is suitably chosen to be a chiral nematic liquid crystal material. The nematic aspect of the liquid crystal material implies a substantial lack of positional order, and accordingly allows the liquid crystal molecules to respond efficiently to relatively small electrical bias. The chiral aspect of the liquid crystal material implies a lack of inversion symmetry in the liquid crystal molecules; this lack of inversion symmetry gives rise to or biases toward a twist of the director across the cell gap. In the absence of a chiral aspect, the nematic liquid crystal will typically have a twist of 90° or less, with the 90° twist being obtained by having the alignment surfaces 46, 47 impart orthogonal orientations to the director. In the etalon 30, the twist across the cell gap is typically greater than 90°, and is more typically greater than or about 100°. It is disclosed herein that with a twist greater than 90° across the cell gap substantially polarization-independent transmission is attainable for the etalon 30. The twist is generally less than 360°, although etalons with twist greater than 360° are also contemplated. In some embodiments, the twist is less than or about 300°. In some embodiments the twist is greater than 90° and less than 360°. In some embodiments the twist is greater than or about 100° and less than 360°. In some embodiments the twist is greater than 90° and less than or about 300°. In some embodiments the twist is greater than or about 100° and less than or about 300°. By having polarization-independent transmission, the etalon can be constructed without passive polarization elements, which increases transmission efficiency.

Without being limited to any particular theory of operation, it is believed that the substantially polarization-independent transmission is obtained because the etalon 30 having a twist of greater than 90°, and in some embodiments greater than or about 100°, can be configured to transmit light via a selected liquid crystal twist angle and cavity thickness at which different non-equal eigenmodes reach resonance conditions simultaneously. These different eigenmodes have different, for example orthogonal elliptical, polarizations and thus the combined transmission via the first and second etalon eigenmodes provides for substantially polarization independent transmission. For high transmittance in the twisted state, for example transmittance greater than or about 90%, it is useful to utilize lower order etalon eigenmodes.

Again without being limited to any particular theory of operation, for contemplated embodiments with twist substantially greater than 360° the operation is believed to be different in kind, relying upon the high-twist liquid crystal layer optically mimicking an isotropic layer in order to provide polarization independence. Such an approach sometimes exhibits hysteresis, and can be difficult to switch. More generally, the high-twist (e.g., greater than 360° twist) is structurally complex and can be difficult to electrically manipulate.

In addition to providing substantially polarization independent transmission for at least one electrical bias (which is optionally zero bias) applied by the electrodes 44, 45, the etalon 30 has an electrically switchable transmission center wavelength (or, equivalently, electrically switchable transmission center optical frequency). In some embodiments, the etalon 30 is configured to transmit two different wavelengths, such as blue or bluish and red or reddish wavelengths, at an operational state defined by one electrical bias (which in some embodiments is zero bias), and is further configured to transmit at least one additional wavelength, such as a green, greenish, blue, or bluish wavelength, at an operational state defined by another bias. Such a device is readily employed in the projector of FIG. 1 by using the bias transmitting the blue and red light during each of the blue and red sub-cycles of the field sequential cycle and using the bias transmitting the green or yellow light during the green or yellow sub-cycle of the field sequential cycle.

Some illustrative examples of the etalon 30 are next described in additional detail. These examples are described using an illustrative Cartesian (x,y,z) coordinate system shown in FIG. 2 for descriptive convenience, in which the z-direction corresponds to the direction of light propagation through the etalon 30. In the following, the optical effects of the electrodes 44, 45 and alignment layers 46, 47 is assumed to be negligible. This can be achieved in practice by making the optical thicknesses of these layers half-wave or smaller than the wavelength of light of interest. Alternatively, the skilled artisan can modify the analyses herein to account for the optical effects of these layers. The optical effect of the substrates 40, 41 is also neglected, which is reasonable for highly transparent substrates such as glass substrates. With these simplifications, the optical system of the etalon 30 reduces to the dielectric mirrors 48, 49 which have transmittances $T_a$, $T_b$ and reflectances $R_a$, $R_b$, and the liquid crystal material 42 of thickness d and effective refractive index $n_{eff}$, the latter value being in general a function of the electrical bias. The transmittance T for the etalon 30 for normally incident light is then given by:

$$T = \frac{T_a \cdot T_b}{\left(1 - \sqrt{R_a \cdot R_b}\right)^2} \cdot \left[1 + \frac{4\sqrt{R_a \cdot R_b}}{\left(1 - \sqrt{R_a \cdot R_b}\right)^2} \sin^2(\delta)\right], \quad (1)$$

where:

$$\delta = 2\pi \left(\frac{n_{eff} \cdot d}{\lambda}\right) \quad (2)$$

denotes the phase shift of light passing through the etalon 30. If the two mirrors 48, 49 of the etalon 30 are identical, then the etalon transmittance T is a maximum for $\delta = m\pi$, where m=1, 2, 3 . . . , and is a minimum for values of $\delta$ halfway between these values. These various maxima $\delta = m\pi$ are referred to herein as etalon orders, i.e. m=1 corresponds to an etalon order, m=2 corresponds to another etalon order, and so forth. The transmittance of the etalon 30 is suitably tuned by adjustment of the optical path length $n_{eff} \cdot d$ of the resonant cavity. Since the physical thickness d is fixed, this entails tuning the effective refractive index $n_{eff}$ of the liquid crystal material 42 using electrical bias applied by the electrodes 44, 45. To provide a large tunable range for $n_{eff}$, a high birefringence nematic liquid crystal material is suitably selected.

A surprising observation is disclosed herein, namely that the etalon 30 employing the liquid crystal material 42 biased by the liquid crystal cell to a twisted liquid crystal layer configuration with a twist angle greater than 90° forms a substantially polarization independent optical switch that provides close to 100% transmission in the twisted state. Without being limited to any particular theory of operation, it is believed that for a suitable choice of the twist angle of the liquid crystal director field in the etalon cavity it is possible for the two eigenmodes to both be in resonance at the same wavelength of light, even though they do not have the same optical path length. This is believed to be due to the fact that at a selected liquid crystal twist angle and cavity thickness, eigenmodes acquire integer multiple of π phase shift at the same time satisfying the conditions of constructive phase shift on reflection from the mirrors. Polarization independent operation can be achieved for zero or other voltage states of the etalon 30 with the liquid crystal material 42 configured by the cell to have intermediate twist between 90° and 360°. This can be used to modulate multiwavelength spectra, and has various applications such as in display devices employing field sequential cycling. The intermediate twist between 90° and 360° enables low etalon mode operation providing a relatively large free spectral range and widely separated transmission peaks that facilitates utility in field sequential illumination applications and other applications for which the etalon transmits in a narrow wavelength range while providing effective light blocking outside this range.

In order to achieve a twist greater than 90°, the liquid crystal material 42 is advantageously chiral, so as to have an inherent tendency toward twist. In contrast, a purely nematic liquid crystal material having no chiral aspect is generally restricted to a maximum twist of 90° induced by orthogonally oriented anisotropy directions for the respective alignment layers 46, 47.

To provide some illustrative numerical examples, the etalon 30 was modeled using numerical simulations. In these simulations, the liquid crystal material 42 was modeled with illustrative material properties including extraordinary refractive index $n_e=1.9$, ordinary refractive index $n_o=1.5$, $\in_\parallel=21$, $\in_\perp=5.5$, $\gamma=0.083$ PaS, and elastic constants $K_{11}\sim14.6$ pN, $K_{22}\sim7$ pN, and $K_{33}\sim29.9$ pN. The liquid crystal director configuration $\vec{D}$ was calculated by minimizing the free energy F which consists of Frank-Oseen elastic energy and electric energy due to the electrical field $\vec{E}$ of the electrical bias applied by the electrodes 44, 45:

$$F = \frac{1}{2} \cdot K_{11}(\nabla \cdot \hat{n})^2 + \frac{1}{2} \cdot K_{22}(\hat{n} \cdot \nabla \times \hat{n} - q_o)^2 + K_{33}(\hat{n} \times \nabla \times \hat{n})^2 - \frac{1}{2} \cdot \vec{D} \cdot \vec{E}, \quad (3)$$

where $q_o$ is the twist constant of the liquid crystal material 42. For a non-chiral material $q_o=0$. In the simulations, infinite anchoring energy was assumed such that liquid crystal molecules on the substrate surfaces (that is, contacting or proximate to the alignment surfaces 46, 47) are fixed permanently with a 2° pretilt angle. The numerical methods used to calculate the liquid crystal director configuration $\vec{D}$ accounted for the backflow effect which substantially increases the switching time for the field off state. Switching and relaxation speeds of the liquid crystal material were determined by measuring the time it takes for the polar angle of the director in the middle of the gap between the substrates 40, 41 to reach 90% of its final value.

In the numerical simulations of the etalon 30, each one of the dielectric mirrors 48, 49 was modeled as a Bragg reflector stack of alternating $TiO_2$ (n=2.27) and $MgF_2$ (n=1.38) layers. For an assembly of q layers of thin film stack, the output field can be calculated as inner multiplications of 2×2 characteristic matrices of individual layers times the input field as follows:

$$\begin{bmatrix} E_{out} \\ H_{out} \end{bmatrix} = \left\{ \prod_{r=1}^{q} \begin{bmatrix} \cos(\delta_r) & i \cdot \sin(\delta_r)/\eta_r \\ i \cdot \eta_r \cdot \sin(\delta_r) & \cos(\delta_r) \end{bmatrix} \right\} \begin{bmatrix} E_{in} \\ H_{in} \end{bmatrix}, \quad (4)$$

where $\delta_r=2\pi N_r d_r/\lambda$ and $\eta_r=N_r\sqrt{\in_o/\mu_o}$. Optical admittance, Y=C/B can be calculated by a normalized version of Equation (4) as follows:

$$\begin{bmatrix} E_{out}/E_{in} \\ H_{out}/H_{in} \end{bmatrix} = \begin{bmatrix} B \\ C \end{bmatrix} = \left\{ \prod_{r=1}^{q} \begin{bmatrix} \cos(\delta_r) & i \cdot \sin(\delta_r)/\eta_r \\ i \cdot \eta_r \cdot \sin(\delta_r) & \cos(\delta_r) \end{bmatrix} \right\} \begin{bmatrix} 1 \\ \eta_{in} \end{bmatrix}. \quad (5)$$

The optical admittance is a useful parameter for analyzing dielectric mirror properties such as reflectance and phase shift on reflection. Optical transmittance of the liquid crystal etalon 30 was calculated by dividing the structure into a finite number of layers of individual optical elements and using a numerical method having a 4×4 matrix formulation which is a solution of Maxwell's equations in one dimension. The effects of the glass substrates 40, 41, electrodes 44, 45, and alignment layers 46, 47 was neglected in the optical calculations, as the effect of these components can be reduced to negligible levels or compensated in actually built devices. The mirror simulations for a mirror as just described with six total layers (that is, $MgF_2/TiO_2$ repeated three times) had a reflectance of at least 80% between 500-600 nm and a large reflectance dropoff below 500 nm. The constituent layers had quarter-wavelength thicknesses at 550 nm except the outside three layers on the light exit side were designed to have quarter-wavelength thicknesses at 525 nm.

Figure 4:
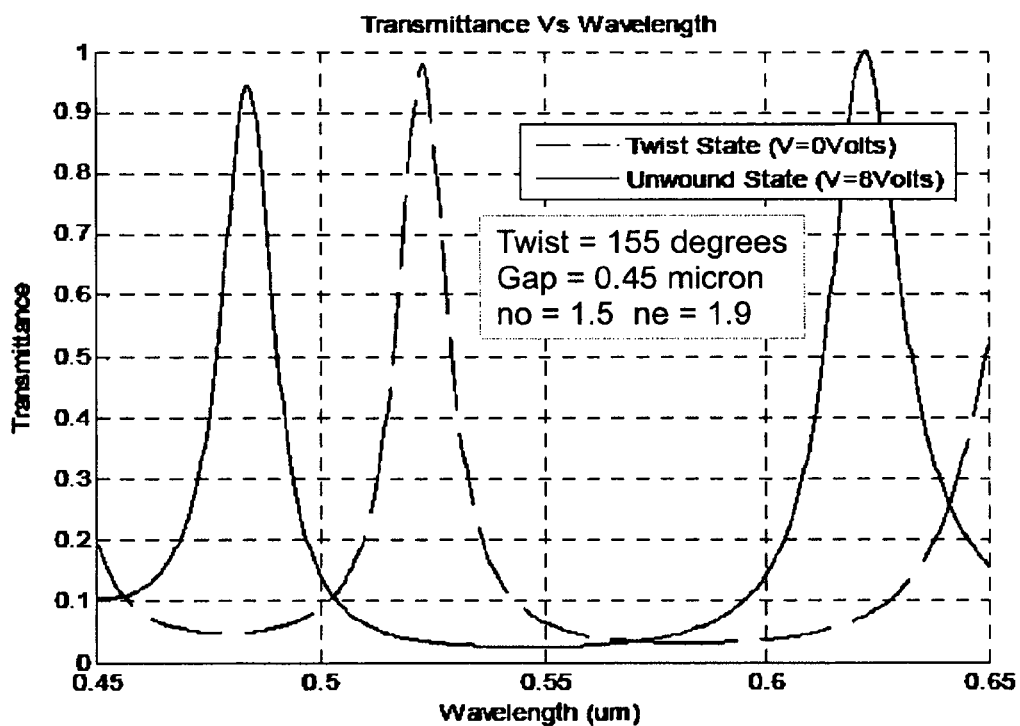
FIG. 4 shows a simulation of a device with the configuration of FIG. 2 designed to provide two states of operation suitable for use in a full color display device.

With reference to FIG. 4, a simulation of the transmittance versus wavelength is shown for the etalon 30 simulated using the described illustrative quantitative parameters for the liquid crystal material 42 and the dielectric mirrors 48, 49. The simulation is for unpolarized light and is at two electrical biases: zero volts and eight volts. The simulated device has a gap thickness of 450 nm and a 155° twist. The ordinary refractive index $n_o=1.5$ is denoted as "no=1.5" in FIG. 4, while the extraordinary refractive index $n_e=1.9$ is denoted as "ne=1.9" in FIG. 4. FIG. 4 shows that at eight volts there are two bandpass regions centered at about 480 nm (blue or bluish light transmission) and at about 620 nm (red or reddish transmission); while at zero volts there is a single bandpass region centered at about 520 nm (green or yellow or greenish or yellowish transmission). All three bandpass regions have peak transmittance well above 90%. Of particular note, the transmission window at about 520 nm obtained with the etalon switched in the twisted state (V=0 volts) is a single peak exceeding 90% transmittance.

Figure 5:
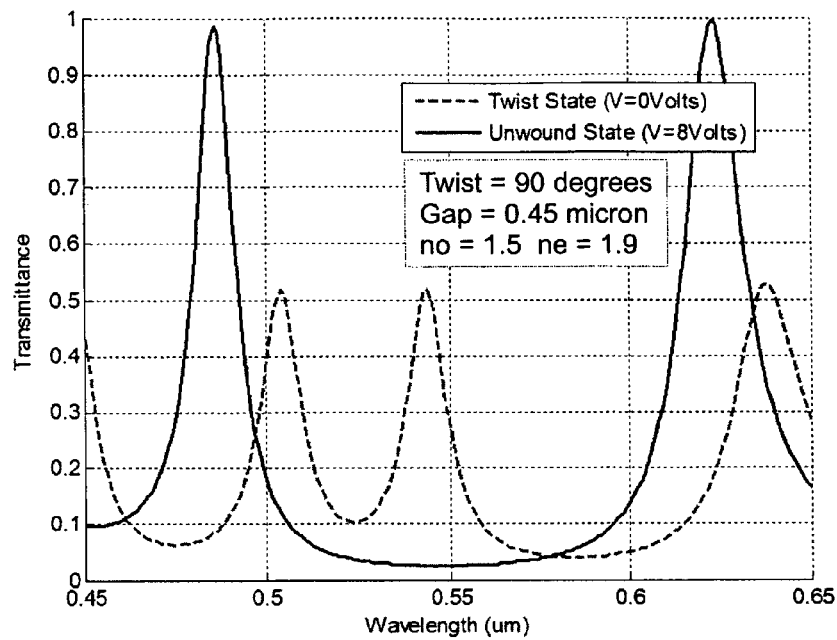
FIGS. 5-8 show simulations of a device similar to that simulated in FIG. 4, but employing different twist angles.
Figure 6:
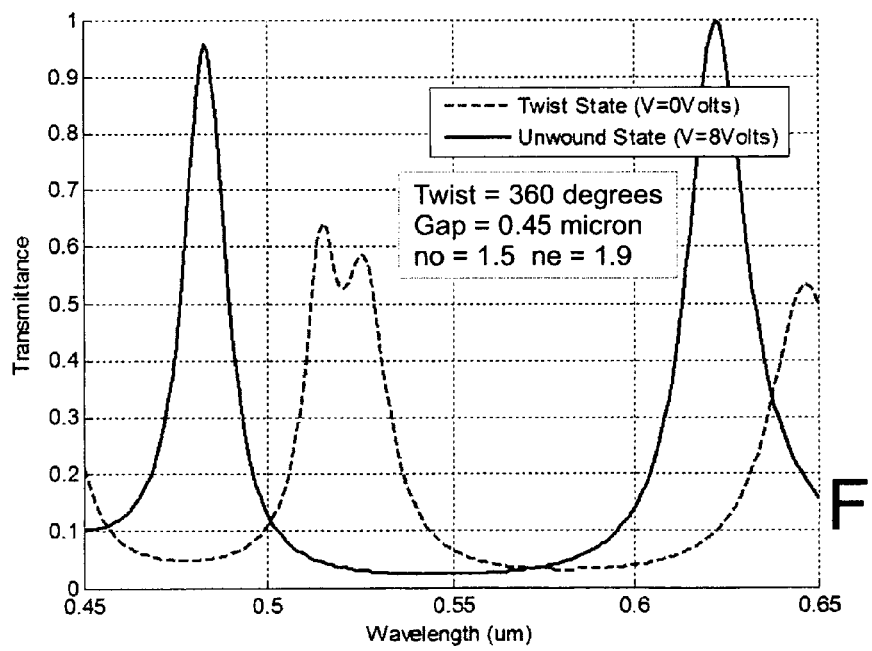
Figure 7:
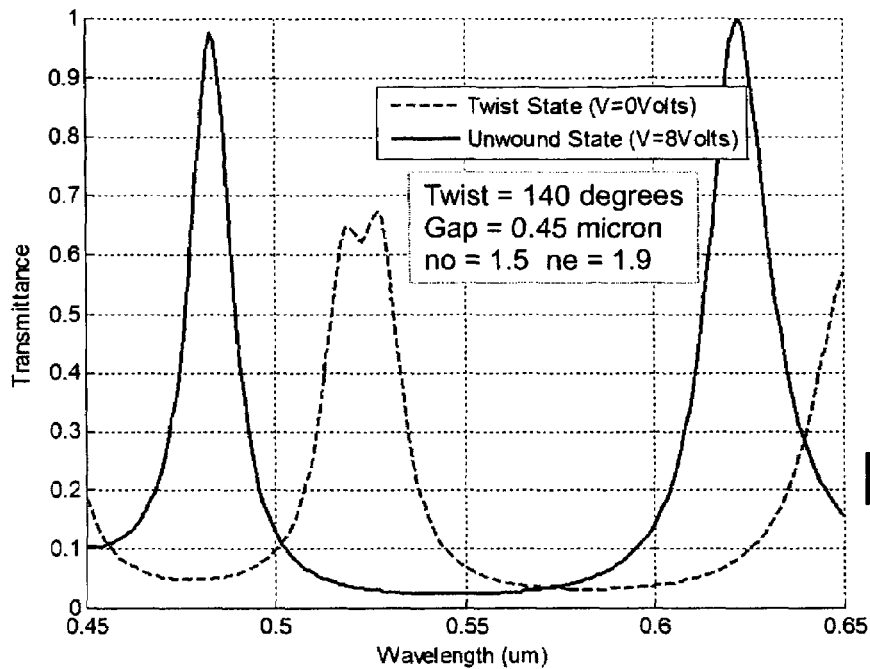
Figure 8:
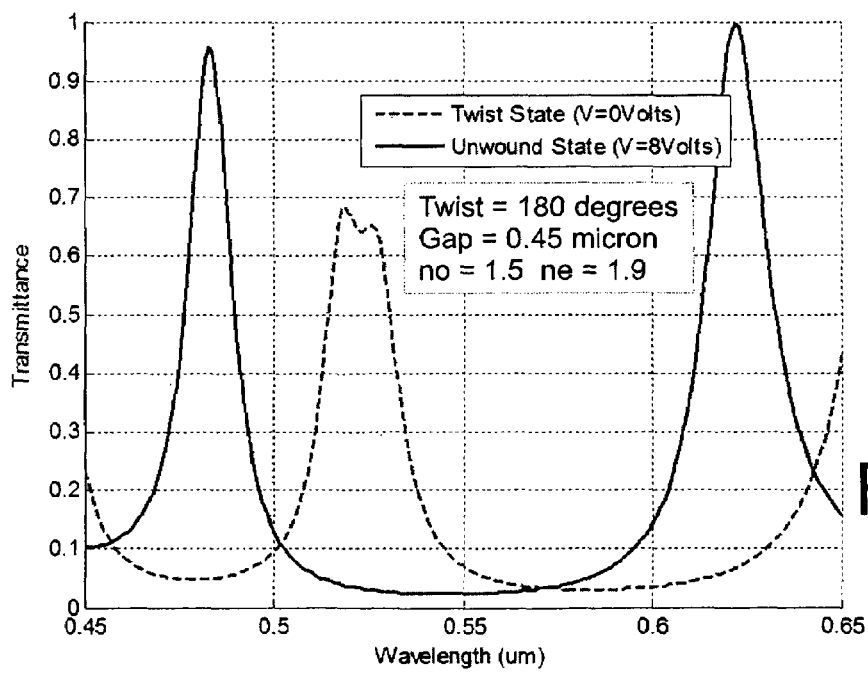

With reference to FIGS. 5-8, a suitable approach for designing the etalon of FIG. 4 is described. This approach employs selecting certain material parameters, such as the gap thickness of 450 nanometers and the ordinary and extraordinary refractive indices $n_o=1.5$ and $n_e=1.9$, respectively, as well as the mirror parameters and optionally other component parameters as already described with reference to the simulation of FIG. 4. These parameters are designed to provide the desired transmittance peaks at 480 nm and 620 nm for the unwound state (e.g., V=8 volts in the illustrated simulations) or for a partially unwound state. This leaves the twist angle as a variable parameter for controlling the transmittance in the wound state. FIG. 5 illustrates a simulation for a 90° twist angle, while FIG. 6 illustrates a simulation for a 360° twist angle. Both simulations show two separate and distinct transmission peaks for the twisted configuration (V=0 volts) which correspond to two different etalon modes of different etalon orders that resonate at different frequencies. This is further evidenced by the maximum transmittance in the wound state for both 90° and 360° being below 70%. FIGS. 7 and 8 show further simulations at 140° (FIG. 7) and 180° (FIG. 8). It is seen that these simulations provide transmittance for the twisted state that is closer to single peak, but is still resolved into a peak doublet indicating some remaining misalignment of the resonance frequencies of the two different etalon modes. In these simulations the maximum transmittance for the wound state has increased slightly. It is evident that the twist should be selected to be a value of somewhere between 140° and 180°. Further simulation enables the twist to be selected as 155°, which as shown in FIG. 4 provides a single twisted state resonance peak with maximum transmittance of close to 100%, indicating polarization independent transmittance. If needed, the position of the transmittance peak in the wound state can be adjusted by varying the electrical bias in the wound state or adjusting one or more material parameter (the latter possibly entailing further adjustment of the peak positions in the unwound state, operating in an iterative manner). Instead of simulations as shown in FIGS. 4-8, it is also contemplated to optimize the twist and other parameters by actually constructing and testing a grid of etalons having the different parameters. In the case of twist, it is contemplated to construct such a test array using a single etalon device in which the alignment layers vary laterally across the etalon to provide regions of different twist for testing. Other optimization approaches are also contemplated, such as applying linear programming to Equations (1) and (2) to obtain optimal parameter values given constraints such as minimum acceptable peak transmittances, bounds on the wavelengths of the transmittance peaks, and so forth.

The device simulated in FIG. 4 can be used in a field sequential mode of operation, for example in the projector of FIG. 1. During the red and blue sub-cycles the lighted pixels of the etalon 30 are suitably biased at eight volts while the unlighted or dark pixels of the etalon 30 are suitably biased at zero volts. On the other hand, during the green or yellow sub-cycle the lighted pixels are suitably biased at zero volts while the unlighted or dark pixels are suitably biased at eight volts. If a level intermediate between lighted and dark is desired, such as a 50% brightness level, then the duration of the lighted setting can be modulated using pulse width modulation (PWM) or another suitable pulse modulation technique in order to control the brightness. It is also contemplated to employ analog modulation of the intensity level by adjusting the electrical bias to modulate the transmittance in an analog fashion.

The device simulated in FIG. 4 can modulate multiple wavelengths in the visible spectrum with near lossless transmittance and high contrast ratio for monochromatic light sources. Such etalon devices are readily designed in the thin, sub-micron range and accordingly have fast switching speed compared to typically thicker half-wave liquid crystal retarders and the like. In estimating switching speed, it should be noted that field-off relaxation speed of the liquid crystal material 42 is expected to be substantially slower than field-on switching speed. Relaxation speed can be estimated analytically by solving dynamical equations of the Freedericksz transition as follows:

$$\tau_{off} = \frac{\gamma \cdot d^2}{\pi^2 \cdot K}, \quad (6)$$

where γ, K, and d are rotational viscosity, elastic constant, and thickness of liquid crystal cell gap, respectively. The field on and off speeds have been numerically modeled by solving the Erickson and Leslie hydrodynamic equations of nematic liquid crystal with a twist term that takes account of the backflow effect. Switching and relaxation speeds of LC were determined by measuring the time it takes for polar angle of the director in the middle of the cavity to reach 90% of its final value. Switching speeds in the range of hundreds of microseconds have been estimated. These fast switching speeds, coupled with multi-wavelength tuneability, enable the etalon 30 to be used in field sequential mobile display applications such as the illustrative projector of FIG. 1.

The etalon simulated in FIG. 4 transmits blue and red wavelengths at the higher biased (eight volt) operational state. However, by adjusting parameters such as the gap thickness, optical properties of the liquid crystal material 42 and the dielectric mirrors 48, 49, and so forth, one can configure the etalon 30 to transmit blue and red wavelengths at the low bias operational state, such as at the zero bias operational state. For the low bias operational state the liquid crystal director configuration is wound or twisted at greater than 90°, and preferably at greater than or about 100°, and polarization independence is achieved by having transmission modes via finding a selected liquid crystal twist angle and cavity thickness at which different non-equal eigenmodes reach resonance conditions simultaneously. On the other hand, in the higher biased (e.g., eight volt) operational state the liquid crystal material 42 is substantially untwisted due to the electrical bias, and so the transmission is again polarization independent.

The illustrated etalon 30 is a light-transmissive etalon. However, it will be appreciated that substantially the same design can be used in a reflective mode, by designing the device to be reflective in the resonant mode.

It will be appreciated that various of the above-disclosed and other features and functions, or alternatives thereof, may be desirably combined into many other different systems or applications. It will be further appreciated that various presently unforeseen or unanticipated alternatives, modifications, variations or improvements therein may be subsequently made by those skilled in the art which are also intended to be encompassed by the following claims.

The invention claimed is:

1. A liquid crystal etalon comprising:
   a chiral nematic material;
   a liquid crystal cell containing the chiral nematic material and having one or more alignment surfaces configured to urge the chiral nematic material toward a twisted liquid crystal configuration having a twist of greater than 90 degrees and less than 360 degrees;
   electrodes operatively coupled with the liquid crystal cell to apply an operative electrical bias to the liquid crystal cell; and
   mirrors disposed about the chiral nematic material to define a resonant optical cavity;
   wherein the etalon provides substantially polarization independent transmission of light at a first wavelength at a first operative electrical bias applied by the electrodes that does not substantially unwind the twisted liquid crystal configuration.

2. The liquid crystal etalon as set forth in claim 1, wherein the alignment surfaces of the liquid crystal cell are configured to urge the chiral nematic material toward a twisted liquid crystal configuration having a twist of greater than or about 100 degrees.

3. The liquid crystal etalon as set forth in claim 2, wherein the alignment surfaces of the liquid crystal cell are configured to urge the chiral nematic material toward a twisted liquid crystal configuration having a twist of less than or about 300 degrees.

4. The liquid crystal etalon as set forth in claim 1, wherein the etalon provides transmission of light at the first wavelength at the first operative electrical bias including transmission via at least two different non-equal resonant eigenmodes.

5. The liquid crystal etalon as set forth in claim 4, wherein the etalon provides transmission of light at a second wavelength different from the first wavelength at a second operative electrical bias applied by the electrodes that is different from the first operative electrical bias.

6. The liquid crystal etalon as set forth in claim 5, wherein the etalon provides transmission of light at a third wavelength different from the first and second wavelengths at the second operative electrical bias applied by the electrodes.

7. The liquid crystal etalon as set forth in claim 1, wherein the etalon does not include any passive polarization elements.

8. The image generating device as set forth in claim 1, further comprising:
a controller electrically communicating with the electrodes to selectively apply to the liquid crystal cell (1) the operative electrical bias that provides substantially polarization independent transmission of light at the first wavelength without substantial unwinding of the twisted liquid crystal configuration and (2) a different operative electrical bias that unwinds the twisted liquid crystal configuration and that provides substantially polarization independent transmission of light at a wavelength different from the first wavelength.

9. A liquid crystal etalon comprising:
a liquid crystal material;
a liquid crystal cell containing the liquid crystal material and urging the liquid crystal material toward a twisted liquid crystal configuration having a twist greater than 90 degrees and less than 360 degrees;
electrodes operatively coupled with the liquid crystal cell to electrically bias the liquid crystal cell; and
mirrors disposed about the liquid crystal material to define a resonant optical cavity;
wherein the liquid crystal material and the liquid crystal cell are configured to define a first operational state at a first electrical bias in which the liquid crystal material has a twisted liquid crystal configuration having a twist greater than 90° and the etalon is transmissive for light of a first wavelength via first and second etalon eigenmodes of different etalon orders.

10. The liquid crystal etalon as set forth in claim 9, wherein the liquid crystal material and the liquid crystal cell are further configured to define a second operational state at a second electrical bias different from the first electrical bias in which the etalon is transmissive for light of a second wavelength different from the first wavelength.

11. The liquid crystal etalon as set forth in claim 9, wherein the liquid crystal cell biases the liquid crystal material toward a twisted liquid crystal configuration having a twist of greater than or about 100 degrees.

12. The liquid crystal etalon as set forth in claim 9, wherein the liquid crystal material is a chiral liquid crystal material.

13. The liquid crystal etalon as set forth in claim 9, wherein in the electrodes are patterned into pixels defining a display area.

14. A projector comprising:
a projection system; and
a liquid crystal etalon as set forth in claim 9, wherein the electrodes of the etalon are patterned into pixels defining a display area and the liquid crystal etalon is arranged respective to the projection system to project an image of the display area.

15. The image generating device as set forth in claim 9, further comprising:
a controller electrically communicating with the electrodes to selectively apply (1) the first electrical bias to select the first operational state and (2) a second electrical bias higher than the first electrical bias to select a second operational state in which the liquid crystal material has an unwound configuration and provides polarization-independent transmission of light of a second wavelength different from the first wavelength.

16. A liquid crystal etalon comprising:
a liquid crystal material;
a liquid crystal cell containing the liquid crystal material and urging the liquid crystal material toward a twisted liquid crystal configuration;
electrodes operatively coupled with the liquid crystal cell to electrically bias the liquid crystal cell; and
mirrors disposed about the liquid crystal material to define a resonant optical cavity;
the liquid crystal material and the liquid crystal cell being configured to define a first operational state at a first electrical bias in which the etalon exhibits at least about 90% transmittance for unpolarized light of a first wavelength, the liquid crystal material having a first twisted liquid crystal configuration at the first electrical bias.

17. The liquid crystal etalon as set forth in claim 16, wherein the first electrical bias is zero bias.

18. The liquid crystal etalon as set forth in claim 16, wherein the first twisted liquid crystal configuration has twist greater than 90 degrees and less than 360 degrees.

19. The liquid crystal etalon as set forth in claim 18, wherein the first twisted liquid crystal configuration has twist greater than or about 100 degrees.

20. The liquid crystal etalon as set forth in claim 19, wherein the first twisted liquid crystal configuration has twist less than or about 300 degrees.

21. The liquid crystal etalon as set forth in claim 18, wherein the first twisted liquid crystal configuration has twist less than or about 300 degrees.

22. The image generating device as set forth in claim 16, further comprising:
a controller electrically communicating with the electrodes to selectively apply the first electrical bias.

23. An image generating device comprising:
an etalon including:
a liquid crystal material,
a liquid crystal cell containing the liquid crystal material and urging the liquid crystal material toward a twisted liquid crystal configuration, and
electrodes operatively coupled with the liquid crystal cell to electrically bias the liquid crystal cell, the electrodes of the etalon defining an array of pixels,
wherein pixels are switchable by a first electrical bias into a first operational state in which the pixel is transmissive for light of a first wavelength, and are switchable by a second electrical bias into a second operational state in which the pixel is transmissive for light of a second wavelength, and wherein the pixels are transmissive for light of a third wavelength in one of the first and second operational states; and a controller electrically communicating with the electrodes to switch pixels between the first and second operational states in synchronization with field sequential illumination having illumination sub-cycles corresponding to the first, second, and third wavelengths in order to generate a color display.

24. The image generating device as set forth in claim 23, further comprising:

an projection system arranged to project an image of the color display, the controller configured to operate a light source of the projection system to generate the field sequential illumination.

25. The image generating device as set forth in claim 23, wherein pixels in the first operational state at the first electrical bias are transmissive for light of the first wavelength via a selected liquid crystal twist angle and cavity thickness at which different non-equal eigenmodes reach resonance conditions simultaneously.

26. The image generating device as set forth in claim 23, wherein the liquid crystal material is chiral.

27. The image generating device as set forth in claim 23, wherein the twisted liquid crystal configuration has a twist greater than 90 and less than 360 degrees.

28. The image generating device as set forth in claim 23, wherein the liquid crystal material comprises a chiral nematic liquid crystal material having a twist at zero bias greater than 90 and less than 360 degrees.

29. The image generating device as set forth in claim 23, wherein pixels are switchable by the first electrical bias into the first operational state in which the pixel is transmissive with at least 90% transmittance for unpolarized light of the first wavelength, and are switchable by the second electrical bias into the second operational state in which the pixel is transmissive with at least 90% transmittance for unpolarized light of the second wavelength, and wherein the pixels are transmissive with at least 90% transmittance for unpolarized light of the third wavelength in one of the first and second operational states with polarization independence.

* * * * *